United States Patent [19]

Tiedje

[11] Patent Number: 4,869,583

[45] Date of Patent: Sep. 26, 1989

[54] OPTICAL BEAM PRECISION POSITIONER

[76] Inventor: Elmer C. Tiedje, 15500-8 Tustin Village Way, Tustin, Calif. 92680

[21] Appl. No.: 95,063

[22] Filed: Sep. 10, 1987

[51] Int. Cl.[4] .............................................. G02B 7/18
[52] U.S. Cl. .................................. 350/636; 350/486; 350/321
[58] Field of Search ............... 350/633, 634, 636, 632, 350/484, 486, 574, 618, 622, 623, 247, 252, 321; 219/121 LU, 121 LV

[56] References Cited

U.S. PATENT DOCUMENTS

| 2,868,063 | 1/1959 | Weiss | 88/14 |
|---|---|---|---|
| 3,582,215 | 6/1971 | Cornillault | 356/152 |
| 3,864,029 | 2/1975 | Mohler | 350/633 |
| 4,023,891 | 5/1977 | Chadwick | 350/634 |
| 4,330,204 | 5/1982 | Dye | 356/152 |
| 4,331,384 | 5/1982 | Eisler | 350/321 |
| 4,367,017 | 1/1983 | Jimbou et al. | 350/486 |
| 4,422,758 | 12/1983 | Godfrey et al. | 356/152 |
| 4,526,447 | 7/1985 | Taylor | 350/636 |
| 4,655,548 | 4/1987 | Jue | 350/245 |
| 4,690,505 | 9/1987 | Iizuka et al. | 350/247 |

FOREIGN PATENT DOCUMENTS

| 154706 | 11/1981 | Japan | 350/632 |
|---|---|---|---|
| 32015 | 2/1986 | Japan | 350/252 |
| 1436330 | 5/1976 | United Kingdom | 350/634 |

OTHER PUBLICATIONS

G. G. Via, "Laser Beam Steering System", *IBM Tech. Dis. Bull.*, vol. 23, No. 6, Nov. 1980, p. 2374.
J. C. Draper et al, "A vacuum . . . ", *J. Phys. E., (GB)*, vol. 3, No. 8, Aug. 1970, pp. 633–635.

*Primary Examiner*—Jon W. Henry

[57] ABSTRACT

An optical beam precision positioner assembly is disclosed. This assembly permits the optics of a laser beam relay to be positioned and secured coincident with the gimbal axis of the laser beam pointing system. An incident laser ray enters the precision positioning system through the midpoint of a spherical pivot, continues to a mirror surface, and the reflected ray exits the system so as to be coincident with a specified axis. The positioner has the capability to translate and/or rotate on three axes to locate the mirror surface at the exact position required to produce a reflected ray coincident to the desired axis. Positioner adjustments are made by rotating screws and back lash in the adjustment screws is eliminated through the use of compression springs. Locking screws located in the positioner secure the alignment.

1 Claim, 4 Drawing Sheets

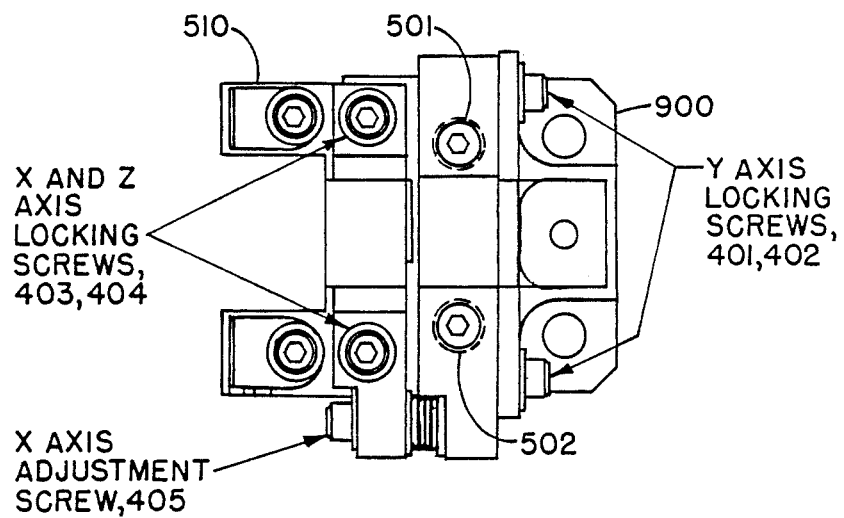
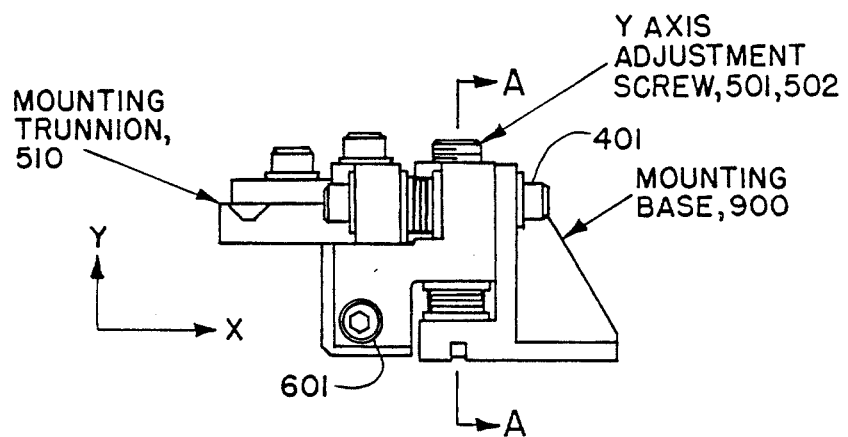

OPTICAL BEAM PRECISION POSITIONER

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to laser pointing systems, and more particularly to an optical alignment mechanism which permits the optics of a laser beam relay to be positioned and secured coincident with the gimbal axis of a laser pointing system.

A variety of optical elements can be selected for use as a laser beam relay, depending upon its purpose and application. These range from a simple conduit, mirrors, and lenses to sophisticated photomultiplier systems described in such texts as "Semiconductor Lasers and Heterojunction LEDs" by H. Kressel and J. Butler, published in New York by Academic Press in 1977, the disclosure of which is incorporated by reference.

The general purpose of a relay is to forward the transmission of a received signal. Electromechanical relays are capable of forwarding signals by simply being in electrical contact with a circuit. Laser beam relays forward optical signals that need to be optically directed towards the destination.

The task of optically aligning the output of laser beam relay systems is alleviated to some extent, by the systems disclosed in the following U.S. Patents, the disclosures of U.S. Pat. No. 2,868,063 issued to Weiss;
U.S. Pat. No. 3,582,215 issued to Cornillault;
U.S. Pat. No. 4,330,204 issued to Dye;
U.S. Pat. No. 4,331,384 issued to Eisler;
U.S. Pat. No. 4,367,017 issued to Jimbou et al; and
U.S. Pat. No. 4,422,758 issued to Godfrey et al.

The Weiss reference discloses an adjustable mirror system for a monochromator in which a mirror support is provided with a three point adjustable suspension. The support and its mirrors are adjustable forward and backward along the optical axis of the system, and are adjustable about an axis parallel to the path of a ray passing between the centers of the angularly related mirrors. The support and mirrors are also adjustable about an axis parallel to the intersection of the plans of the angularly related mirrors. The support for the angularly disposed mirrors comprises a plate supported by three adjustment screws.

Eisler shows a micropositioning system which enables the precise positioning of optical elements in any orthogonal direction and about any desired axis. Cornillault is directed to an apparatus for aligning a three axis laser telemetery system and Godfrey et al describe boresighting of an airborne designator laser.

In Jimbou et al a laser beam enters a laser beam reflection system through an aperture in a welding head housing which is adapted to be rotated around an axis. Dye discloses an automatic alignment mechanism for use in a reciprocal tracking laser communicator. Electromechanical means, responsive to received optical energy reflected by mirror and focused onto a detector, rotates a transceiver in accordance with the location of the blur circle of energy on a detector so that the transceiver is aligned with the source of the optical transmission.

While the references cited above are instructive, a need remains for a laser relay positioning system. The present invention is intended to satisfy that need.

SUMMARY OF THE INVENTION

The present invention is an optical alignment mechanism which permits the optics of a laser beam relay to be positioned and secured using: a spherical pivot, a precision positioner, and a mounted mirror. The precision positioner is a frame which houses: the relay, the spherical pivot and the mounted mirror in proximity with a laser source. An incident laser ray enters the system through an optical aperture in the midpoint of the spherical pivot. The spherical pivot directs the ray into the laser relay which, in turn, relays the beam to the mounted mirror. The mounted mirror directs the beam in the manner discussed below.

The present invention may be expressed in a variety of embodiments which use the precision positioner to adjust the position of the laser beam so that it is coincident with a desired axis. In one embodiment, the precision positioner houses the mounted mirror in a forward mount. The forward mount includes two trunnions supported by a three axis adjustment mechanism. The three axis adjustment mechanism can be used to adjust the X axis, the Y axis and Z axis both independently and in concert. The result is a translation and/or rotation of the mirror surface to the exact position required to produce a reflected ray coincident with a desired vector.

It is an object of the present invention to provide a system which permits the optical output of a laser beam relay to be positioned and secured along a precise axis.

It is another object of the present invention to provide an optical adjustment assembly capable of providing rotation and translation in three dimensions.

It is another object of the invention to provide an optical system which receives and positions an incident ray coincident along a desired axis in space.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

FIGS. 4, 5 and 6 respectively depict a plan view, a side view, and a front view of the laser relay optics adjustment assembly;

DESCRIPTION OF THE PREFERRED EMBODIMENT

The present invention is an assembly which permits the optics of a laser beam relay to be positioned and secured coincident with the gimbal axis of a laser pointing system.

Figure 1:
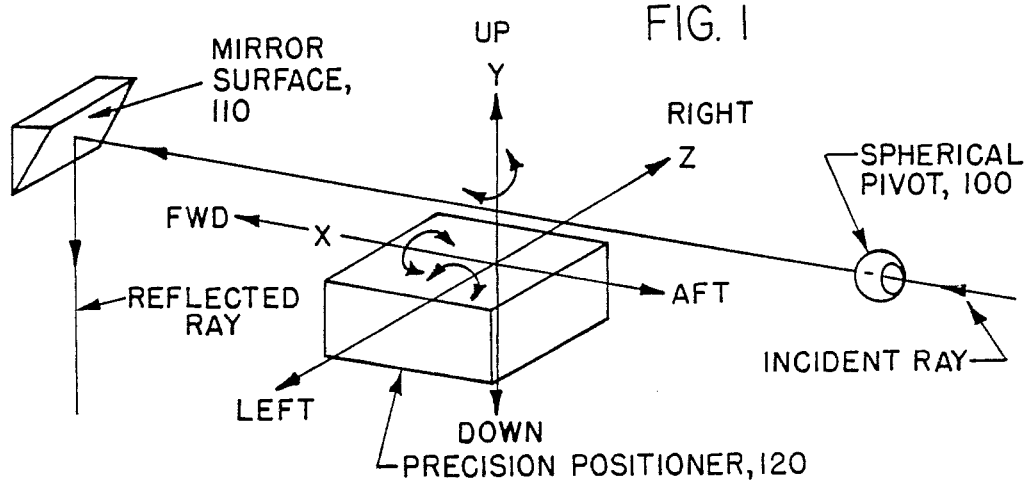
FIG. 1 is a mechanical schematic that depicts the basic elements of the present invention.

The reader's attention is now directed towards FIG. 1 which is a mechanical schematic depicting the basic elements and principles of the present invention. The system of FIG. 1 includes a spherical pivot 100 and mirror 110 mounted on a precision positioner mechanism 120. The spherical pivot 100 is an optical element with a pivoting central aperture which receives an incident laser beam from a laser source, and directs it towards the mirror 110.

The precision positioner 120 has a set of adjustment screws that give it the capability to translate and/or rotate the mirror surface along the X axis, the Y axis, and the Z axis, to the exact position required to produce a reflected ray along a desired axis. The details of the use of the adjustment screws and the use of the invention with a laser beam relay are discussed in detail below. Note that in another embodiment of the system of FIG. 1, the relay itself is tilted by the precision positioner to adjust the angle of incidence of the laser beam of the relay as the beam approaches the mirror 110. This also has the effect of directing the reflected ray along the desired axis.

Figure 2:
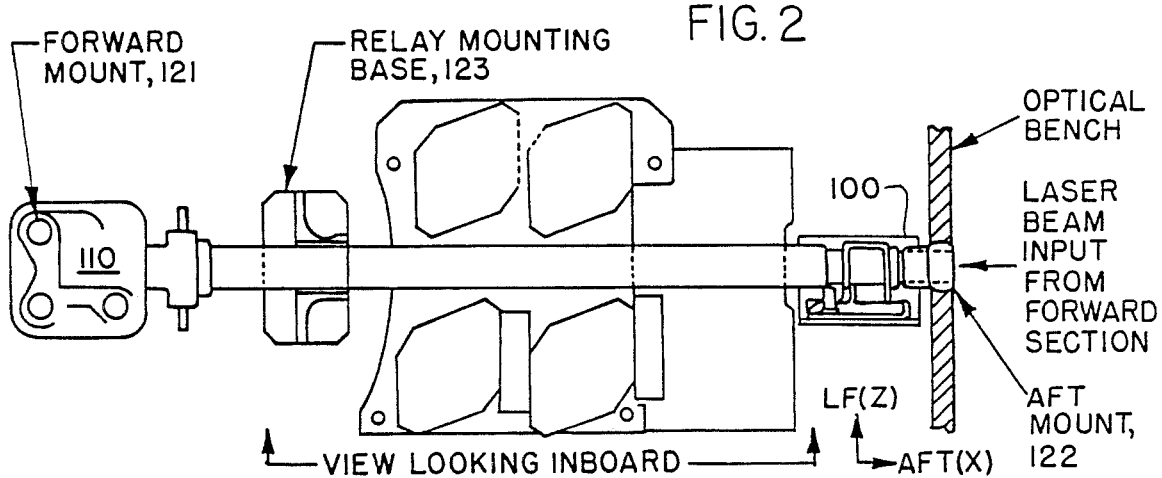
FIG. 2 is a side view of the invention when it is used as a laser relay adjustment mechanism.
Figure 3:
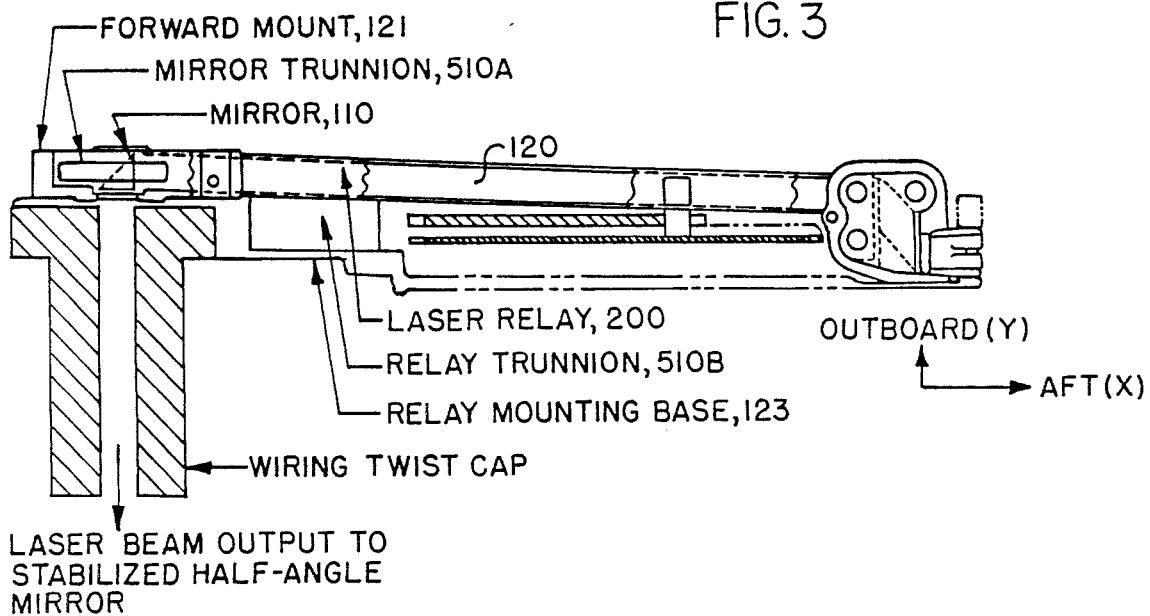
FIG. 3 is a plan view of the system of FIG. 2.

FIGS. 2 and 3 are two views of a detailed illustration of the present invention. FIG. 2 is a side view of the invention when used as a laser relay optics installation. FIG. 3 is a plan view of the system of FIG. 2.

The precision positioner 120 in FIGS. 2 and 3 is a frame with: a forward mount 121, aft mount 122, and a relay mounting base 123. The aft mount 122 includes a preloaded swivel, which is formed by a spherical fitting fitted into a cylindrical aperture This preloaded swivel acts as the spherical pivot 100 mentioned in FIG. 1, and directs the incident laser beam from a source through the laser relay to the mirror 110. The spherical pivot should be located at the origin of the laser beam.

The forward mount 121 includes two trunnions 510A and 510B, each of which are supported by a three axis adjustment mechanism mounted to the base of the frame. The two trunnions 510A and 510B are used to support the mirror and the laser relay, and the three axis adjustment mechanisms serve to tilt the mirror and laser relay such that the reflected laser beam is directed along a desired axis. The details of the three axis adjustment mechanism are described in detail below.

The relay mounting base 123 allows a conventional laser relay 200 to be mounted in the assembly such that the relay optics are colinear with a vector from the spherical pivot 100 to the mirror 110. With the relay 200 fixed in this position, the tilting mechanism of the forward mount 121 allows the output of the laser beam relay to be directed along the desired axis by tilting either the mirror 110, the laser relay 200, or both the mirror 110 and the laser relay 200.

Figure 6:
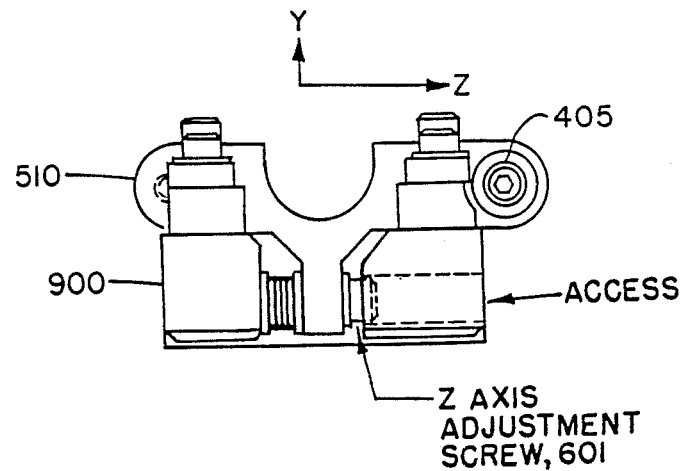

FIGS. 4, 5 and 6 respectfully depict a plan view, a side view, and a front view of the laser relay optics adjustment assembly used in the system of FIGS. 2 and 3. The mounting trunnion 510 of FIGS. 4 and 5 is an example of the two mounting trunnions 510A and 510B depicted in FIG. 3. This assembly allows the mirror surface or the laser relay to be translated and rotated along the axis of the adjustment to position the reflected beam of the laser relay. The assembly is operated as follows.

First, the X, Y, and Z axis locking screws 401-404, shown in the plan view of FIG. 4, are loosened. This allows the mirror surface, which is held by the mounting trunnion 510A, to be positioned along all three axes. Referring back to FIGS. 2 and 3, the Z axis is a lateral axis; the X axis is parallel to the path of the laser beam in the assembly; and the Y axis is normal to both the Z axis and the X axis.

Next, the X (longitudinal) axis adjustment screw 405 and the Z (lateral) axis adjustment screw 601 are adjusted to bring the laser beam into lateral alignment with the desired exit path of the laser beam. As these screws are turned the mirror is tilted so that it is positioned along the X and Z axes.

The two Y (vertical) axis adjustment screws 501 and 502 are adjusted to bring the laser beam into angular alignment with the outer gimbal (pitch) axis. Tandem motion of the two screws moves the beam in a horizontal plane passing through the pitch axis and differential motion of the two adjustment screws rolls the relay about its longitudinal axis to move the beam in a vertical plane passing through the pitch axis.

The adjustments above can be iterated as required to achieve a precise lateral and angular alignment of the laser beam with the desired axis.

Finally, the X, Y, and Z locking screws 401–404 are tightened to secure the assembly when the laser beam has been positioned as desired.

As described above, the X, Y and Z adjustment screws are capable of translating the mounting trunnion 510 with respect to the mounting base 900 of the 3 axis adjustment assembly. However, these screws are also capable of rotating the trunnion about the X, Y and Z axis when they are operated as follows. Note that the Y axis adjustment screws 501 and 502 are spaced apart from each other When they are turned in unison, they collectively raise and lower the mounting trunnion 510 with respect with the base 900. When a single Y axis adjustment screws is turned, the mounting trunnion 510 is Full three-axis translation and rotation of the trunnion with respect to the base 900 is accomplished by turning the adjustment screws clockwise (CW) and counter clockwise (CCW) as depicted below in Table 1. The adjustment screws identified in Table 1 move the trunnion along the X, Y and Z axis as depicted in FIG. 1. An adjustment along the X axis moves the trunnion forward or aft as depicted in FIG. 1. An adjustment along the Y axis moves the trunnion up and down as depicted in FIG. 1. An adjustment along the Z axis moves the trunnion left and right as depicted in FIG. 1. In Table 1 under the column entitled "Desired Reflected Ray Adjustment" the terms "Forward" and "AFT" indicated that the trunnion is translated forward and aft along the X axis; while the terms "Rotate CW" and "Rotate CCW" indicate that the trunnion is tilted about the axis. Similarly the terms "Left" and "Right" (for the Z axis) and the terms "Up" and "Down" (for the Y axis) all designate a translation along that axis; while the term "Rotate" always refers to tilting about an axis.

As depicted in FIGS. 4 and 5, the Y axis adjustment screws 501 and 502 are parallel with the Y axis, and when rotated they elongate the trunnion mounting from the trunnion base along the Y axis. The same is true for translation along the X and Z axes: their respective adjustment screws translate the trunnion when rotated.

TABLE 1

| AXIS | DESIRED REFLECTED RAY ADJUSTMENT | ADJUSTMENT SCREWS ROTATED | | | |
|---|---|---|---|---|---|
| | | CW 1 SCREW | CCW 1 SCREW | CW 2 SCREWS | CCW 2 SCREWS |
| X | FORWARD | | 405 | | |
| | AFT | 405 | | | |
| | ROTATE CW | 506 | 502 | | |
| | ROTATE CCW | 502 | 501 | | |
| Z | LEFT | 601 | | | |
| | RIGHT | | 601 | | |
| | ROTATE CW | | | | 501, 502 |
| | ROTATE CCW | | | 501, 502 | |
| Y | UP | | | | 501, 502 |
| | DOWN | | | 501, 502 | |
| | ROTATE CW | | 601 | | |
| | ROTATE CCW | 601 | | | |

Figure 7:
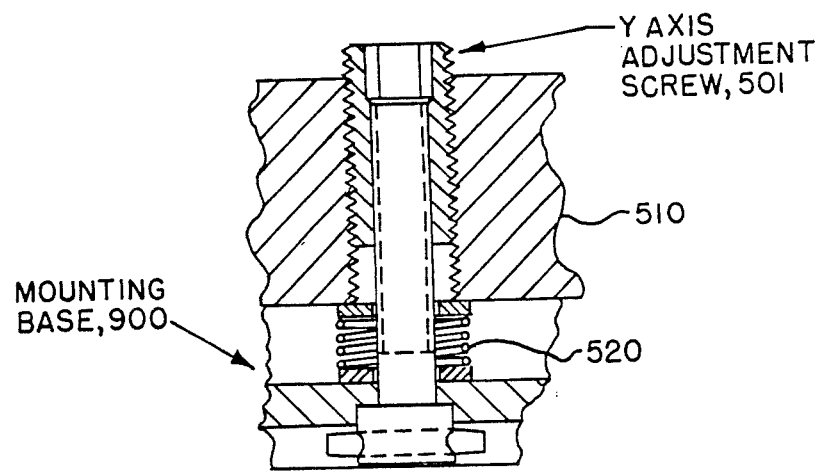
FIG. 7 is a detailed view of an example of a Y axis adjustment screw.
Figure 10:
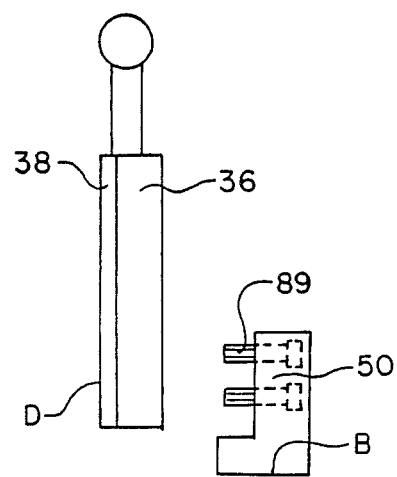

FIG. 7 is a detailed view of an example of a Y axis adjustment screw 501. The purpose of FIG. 10 is to illustrate how the mounting screw serves to raise and lower the mounting trunnion surface 510 with respect to the mounting base 500. Note that backlash in the adjustment screw is eliminated through the use of compression springs. Once the Y axis adjustment screw 501 is positioned as desired, the Y axis locking screws 401 and 402 of FIG. 4 may be tightened to secure the mounting trunnion 510 in this adjusted position.

Note that the X, Y and Z locking screws are all respectively perpendicular with the X, Y and Z adjustment screws. When these locking screws are engaged, they respectively prohibit movement in the longitudinal, vertical and lateral axes.

The reader's attention is now directed back to FIGS. 2 and 3. In the first embodiment of the invention, the mirror was adjustably tilted by a trunnion while the laser relay was in a fixed position. Another embodiment of the invention entails the use of the three-axis adjustment assembly to rotate the laser beam relay while the forward mount 121 holds the mirror at a fixed 45° angle with respect to the assembly. The principle of this embodiment entails an adjustment of the laser beam reflected from the mirror 110 by making changes in the angle of incidence of the laser beam from the relay as it strikes the mirror's surface. This is accomplished as follows:

Referring to FIGS. 4, 5 and 6, the mounting trunnion 510 is used to mount the laser beam relay as illustrated in FIG. 3 in the relay trunnion 510B. The X, Y and Z adjustment screws are respectively mounted longitudinally, vertically and laterally between the mounting base 900 and the trunnion to translate and rotate the trunnion 510 with respect to the mounted base 900, in the manner discussed earlier.

Figure 8:
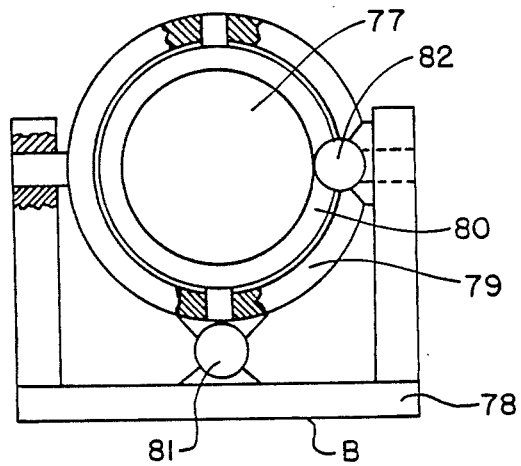
FIGS. 8–10 are illustrations of prior art spherical pivot elements, that may be used in the system of FIGS. 1–3.
Figure 9:
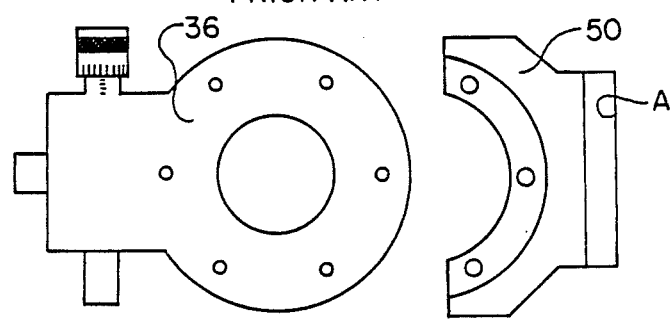

FIGS. 8-10 are illustrations of prior art examples of spherical pivot elements used in the above-cited Eisler reference. As mentioned above, a spherical pivot is an optical element with a pivoting central aperture. In FIG. 8 this central aperture is an interferometrical tilting socket 77 which is pivotally mounted on a base plate 78 by setting members 81 and 82, which are capable of tilting it on two perpendicular axes.

When the system of FIG. 8 is used as an optical alignment system, the tilting socket 77 usually holds an interferometrical cylinder with a spherical mirrored inner surface, and, which is capped on one end by a lens. An example of such an optical element is described in the above-cited Dye patent.

FIGS. 9 and 10 respectively depict an end view and a side view of another example of a prior art spherical pivot element used in the above-cited Eisler reference. Such optomechanical elements are common in the art and come in a variety of configurations. In FIGS. 9 and 10, the spherical pivot element 36 is attached to the support member 50 by a set of fixing bolts 84, which adjusts its angular position. These fixing bolts are shown in FIG. 10 to extend out of the support member 50 and are threaded so that they may be screwed into the spherical pivot elements 36 with different lengths.

While the system has been described as having a single three axis adjustment assembly used to position either the laser relay or the mirror to desired tilt angle locations, variations of the present invention can include use of several three axis adjustment assemblies. For example, the aft mount 122, the forward mount 121 and relay mount 123 may all conceivably make use of the adjustment assembly depicted in FIGS. 4, 5 and 6.

The fixing bolts 84 position the spherical element 36 at different adjustable angles as they screw into it. As each bolt is progressively screwed into the spherical element 36, it diminishes the distance between the spherical element 36 and the support members 50. The result is an adjustably tiltable bore system D.

The three axis adjustment assembly of FIGS. 4-6 is just a single example of a system which is capable of adjusting the laser relay on the mirror to desired tilt angle locations. Another example of an adjustable support assembly which is capable of multi-axis tilting of optical elements is disclosed in the above-cited Weiss reference. The adjustable mirror support assembly of the Weiss reference can be placed on the frame of the system of FIG. 3 to tilt the mirror 110 as an alternative to the mirror trunnion 510A. Similarly, the Weiss system can also serve as alternative to the relay trunnion S10B to tilt the laser relay 200. In this manner, both the laser relay and the mirror can be adjustably tilted, in the manner described above, by their own respective trunnions. Additionally, while the invention was developed for use with state-of-the-art laser relays, the invention may be used to adjust the output beam of any optical element that receives and relays optical beam, such as a lens, etc.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A laser relay mounting assembly which receives and conducts an incident laser beam to a laser beam relay which produces therefrom a laser output, said laser relay mounting assembly adjusting said laser output coincident with a desired axis, said laser relay mounting assembly comprising:
- a laser beam relay;
- a frame, upon which said laser beam relay is mounted;
- a spherical pivot which is mounted on said frame and which receives and directs said incident laser beam to said laser beam relay;
- a mirror mounted on said frame;
- a relay mounting trunnion which holds said laser beam relay so that it is between and colinear with said spherical pivot and said mirror;
- a first positioning mechanism which has a base that attaches said relay mounting trunnion to said frame, said first positioning mechanism tilting and translating said laser relay into a position such that said mirror reflects said laser output so that it is coincident with said desired axis by adjusting said output laser's angle of incidence as it reaches said mirror;
- a mirror mounting trunnion which holds said mirror so that it is colinear with said spherical pivot and said laser beam relay; and
- a second positioning mechanism which has a base that attaches said mirror mounting trunnion to said frame, said second positioning mechanism being able to translate and rotate said mirror mounting trunnion in three dimensions with respect to said frame, said second positioning mechanism thereby tilting and translating said mirror into a position such that it reflects said laser output so that it is coincident with said desired axis.

* * * * *